United States Patent [19]

Santillo, Jr.

[11] 3,915,770

[45] Oct. 28, 1975

[54] METHOD AND APPARATUS FOR THERMO-CHEMICALLY SLICING CRYSTAL BOULES

[75] Inventor: George R. Santillo, Jr., Wappingers Falls, N.Y.

[73] Assignee: International Business Machines Corporation, Armonk, N.Y.

[22] Filed: Dec. 16, 1974

[21] Appl. No.: 533,036

[52] U.S. Cl. .................... 156/7; 156/345
[51] Int. Cl.$^2$ .................... C23F 1/02
[58] Field of Search .................... 156/2, 7, 17, 345

[56] References Cited

UNITED STATES PATENTS 2,144,370 1/1939 Gerlach .................... 156/7
2,933,437 4/1960 Loosme .................... 156/2

*Primary Examiner*—William A. Powell
*Assistant Examiner*—Brian J. Leitten
*Attorney, Agent, or Firm*—William J. Dick

[57] ABSTRACT

Disclosed is a method and apparatus for thermochemically slicing wafers from a crystal boule by propelling a continuous flow of an acid etching solution against a heated wire which is adjacent the intended line of etch while providing for relative movement between the boule and the chemical etching solution to thereby effect a slicing action of the boule.

16 Claims, 2 Drawing Figures

METHOD AND APPARATUS FOR THERMO-CHEMICALLY SLICING CRYSTAL BOULES

The purpose of this abstract is to enable the public and the Patent Office to determine rapidly the subject matter of the technical disclosure of the application. This abstract is neither intended to define the invention of the application nor is it intended to be limiting as to the scope thereof.

SUMMARY OF THE INVENTION AND STATE OF THE PRIOR ART

The present invention relates to a method and apparatus for slicing crystal boules, and more particularly relates to a method and apparatus for slicing a boule of semi-conductor material into wafers.

For a number of years the formation of silicon wafers from a single crystal ingot or boule has been achieved by the use of internal diameter or outer diameter cutting wheels employing a diamond coated revolving blade. The major cutting or slicing machine for cutting semi-conductor wafers is, for example, shown in U.S. Pat. No. 3,039,235, issued on June 19, 1962 to Heinrich. In this machine, a donut shaped blade, having diamond frit on the interior or internal edge is used to cut the semi-conductor boule into discrete wafers of semi-conductor material. This type of machine operates very well except that some surface damage is incurred on the wafers due to the abrasive action of the diamond frit as the blade rotates against the surface of the wafer. Of course such surface damage must be removed as by lapping and polishing prior to using the wafer in the manufacture of semi-conductors.

In view of the above, it is a principal object of the present invention to provide a novel method and apparatus for slicing semi-conductor wafers from a boule of crystal in which surface damage on the surface of the wafer is effectively reduced.

Another object to the present invention is to provide an improved method and apparatus for slicing semi-conductor ingots into discrete semi-conductor wafers regardless of the diameter of the crystal boule.

Still another object to the present invention is to provide a simplified method and apparatus for slicing semi-conductor material or boules which is economically feasible for even the small manufacturer.

Figure 1:
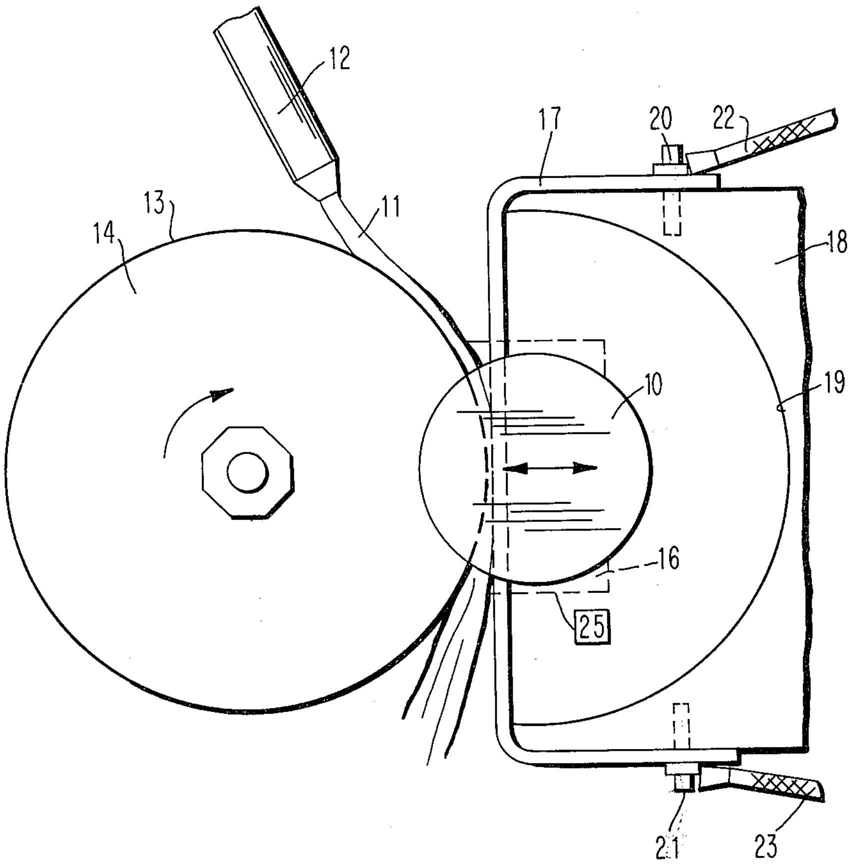
Figure 2:
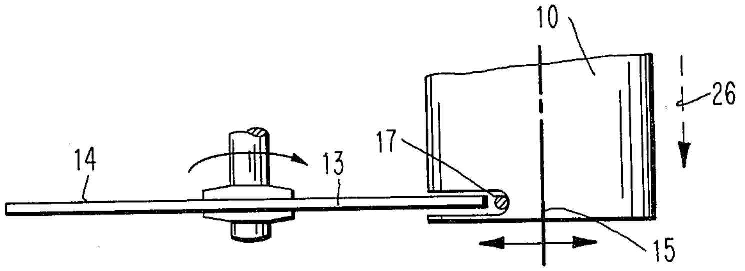

Other objects and a more complete understanding of the invention may be had by referring to the following specification and claims taken in conjunction with the accompanying drawings in which:

FIG. 1 is a fragmentary schematic view of apparatus which may be employed to practice the novel method of the present invention; and FIG. 2 fragmentary plan view of the apparatus illustrated in FIG. 1.

Referring now to the drawing, and especially FIG. 1 thereof, apparatus constructed in accordance with the present invention is illustrated therein, the apparatus being designed to propel and treat a chemical etching solution along a line of intended etch and along a predetermined plane with respect to the longitudinal axis of a boule 10 of crystal. To this end, a chemical etching solution 11 is applied, as by a nozzle 12, tangentially to the periphery 13 of a rotating etchant applicator wheel 14 in such a manner as to effect propelling of the chemical etching solution radially outward along a line of intended etch and along a predetermined plane with respect to the longitudinal axis 15 of the boule 10. In the illustrated instance, the predetermined plane is substantially perpendicular to the longitudinal axis 15 of the boule.

The boule 10 may be clamped, as by clamping means 16, in any conventional, convenient manner. For example, the clamp may take the form of a typical jawed chuck and the like, or may take the form of the crystal indexing fixture shown in U.S. Pat. application Ser. No. 305,018 , filed Nov. 9, 1972, now U.S. Pat. No. 3,855,738 of Guggenheim et al., owned by the Assignee of the present invention.

In accordance with the invention, heat is applied adjacent the area of the line of intended etch to thereby heat at least one of the boule and the solution. To this end, and as shown best in FIG. 1, a heating element or wire 17 is clamped to an insulator 18 having an aperture or notch 19 therein to receive the boule 10. The wire 17 is attached to the insulator as by pins 20 and 21 which permit extending the wire over the slot or opening 19. A source of power (not shown) is connected to the pins 20 and 21 as by cables 22 and 23 to permit the passage of current through the wire to heat the wire. Of course the wire should be composed of a material generally impervious or resistant to attack by the chemical etchant. In this connection, the wire and the wheel materials may be composed of, for example, tantalum, or columbium, or even tungsten, although tantalum is to be preferred.

Preferably, the wire is positioned adjacent the periphery 13 of the wheel 14 and, during the slicing or cutting operation precedes the wheel through the boule 10.

By passing current through the wire, the wire achieves a high temperature which tends to heat both the boule 10 and the etching solution 11 which tends to accelerate the etching action of the etchant along the intended line of etch and along the predetermined plane relative to the axis of the boule.

In practice, the etching solution may vary, depending upon the structure of the boule, the speed of the cut and the finished surface desired. For example, the acid etchant may be comprised of a mixture of acids such as nitric acid ($HNO_3$), hydrofluoric acid (HF) and acetic acid ($C_2H_4O_2$) in concentration by volume of: 3:2:1; 5:3:1; or 8:3:1. It should be recognized that the etching acid may take the form and composition of a number of mixture formulations and those described and defined above are only by way of example.

The temperature of the etchant may be raised by the heated wire approximately 50° to 100° centigrade to accelerate the cutting action of the etchant. The proximity of the wire, however, to the boule does effect a heating action, simultaneously, on the boule itself, which heating action also tends to accelerate the speed by which the etchant effects removal of the silicon and permits the formation of a wafer.

In order to effectively form a crystal wafer, in the illustrated example a wafer of semi-conductor material, relative motion must be applied between the boule and the chemical etching solution. To this end, the chuck 16 may be connected to, for example, drive means 25 which tends to effect reciprocation of the boule 10 in a direction along the predetermined plane of cut. It should be recognized that the boule on the other hand, could be kept stationary and the wheel and wire as well as insulator block 18 moved to effect such relative motion.

Additionally, after each cut, the boule may be indexed in the direction of arrow 26, to place the boule 10 in the proper position for a new cut.

Although the invention has been described with a certain degree of particularity, it is understood that the present disclosure has been made only by way of example and that numerous changes in the apparatus and the process may be made without departing from the spirit and the scope of the invention as hereinafter claimed.

What is claimed is:

1. A method of slicing a crystal boule to form a wafer, said method comprising the steps of: clamping a boule; propelling a chemical etching solution along a line of intended etch and along a predetermined plane with respect to the longitudinal axis of said boule; applying heat adjacent the area of said line of intended etch to thereby heat at least one of said boule and said solution, and providing relative movement between said boule and said chemical etching solution to thereby effect a slicing action of said boule.

2. A method of slicing a crystal boule in accordance with claim 1, wherein said propelling step occurs due to the rotation of a wheel which to the periphery thereof has been applied said etching solution.

3. A method of slicing a crystal boule in accordance with claim 1, wherein said heating step occurs by the steps of; providing a wire resistant to said chemical etching solution; positioning said wire adjacent said boule, intermediate said boule and said chemical solution, and passing an electric current through said wire to heat said wire.

4. A method in accordance with claim 3, wherein sufficient current is passed through said wire to heat said solution between 50°–100°C.

5. A method of slicing a crystal boule in accordance with claim 1, including the steps of; rotating an etchant applicator wheel in said predetermined plane to propel said chemical etching solution; providing a heating element between said applicator wheel and said boule, and passing a current through said element to heat said element and to thereby heat at least one of said boule and said solution.

6. A method of slicing a crystal boule in accordance with claim 5, including the step of applying said etchant to said etchant applicator wheel tangentially to said wheel whereby said etchant is propelled radially from said wheel.

7. A method of slicing a crystal boule to form a wafer, said method comprising the steps of: clamping the boule at one end thereof; propelling a chemical etching solution along a line of intended etch and along a predetermined plane with respect to the longitudinal axis of said boule; heating said solution at a point adjacent the line of intended etch and providing relative movement between said boule and said chemical etching solution to thereby effect a slicing action of said boule.

8. a method of slicing a crystal boule in accordance with claim 7, including the steps of; rotating an etchant applicator wheel in said predetermined plane to propel said chemical etching solution; providing a heating element between said applicator wheel and said boule, and passing a current through said element to heat said element and to thereby heat at least one of said boule and said solution.

9. A method slicing a crystal boule in accordance with claim 8, including the step of applying said etchant to said etchant applicator wheel tangentially to said wheel whereby said etchant is propelled radially from said wheel.

10. Apparatus for slicing crystal boules, said apparatus comprising: means to clamp a boule in a predetermined position; means for propelling an etchant onto said boule along an intended line and plane of etch, means for applying heat to at least one of said boule and said solution along said intended line of etch, and means for providing relative movement between said boule and said chemical etchant to thereby effect a slicing action of said boule.

11. Apparatus in accordance with claim 10, wherein said means for applying heat to at least one of said boule and said solution comprises a heating element resistant to said etching solution, in the plane of etch and adjacent said boule, and means to permit the passage of current through said element.

12. Apparatus in accordance with claim 11, wherein said heating element comprises a wire.

13. Apparatus in accordance with claim 10, wherein said etchant comprises an acid solution.

14. Apparatus in accordance with claim 12, wherein said means for propelling said etchant comprises a rotating etchant applicator wheel in said plane of etch.

15. Apparatus in accordance with claim 13, wherein said acid solution comprises a mixture of nitric acid, hydrofluoric acid and acetic acid.

16. Apparatus for slicing a boule of semi-conductor crystal into discrete wafers, said apparatus comprising; means to clamp a boule in a predetermined position; a rotatable etchant applicator wheel and a nozzle positioned to apply chemical etchant material onto the periphery of said wheel, said wheel being positioned in a plane along the intended line of etch of said boule; a heating element intermediate said boule and said wheel and in said plane; and means for providing relative movement between said boule and said chemical etchant to thereby effect a slicing action of said boule.

* * * * *